United States Patent [19]

Bischoff et al.

[11] 4,298,840
[45] Nov. 3, 1981

[54] PLURAL ELECTRODE METHOD AND MEANS FOR WATER BOTTOM LOGGING

[75] Inventors: Jürgen H. Bischoff; Joachim A. Sebulke, both of Berlin, Fed. Rep. of Germany

[73] Assignee: Shell Internationale Research Maatschappij B.V., Netherlands

[21] Appl. No.: 36,681

[22] Filed: May 7, 1979

[30] Foreign Application Priority Data

May 19, 1978 [GB] United Kingdom ............... 20741/78

[51] Int. Cl.³ .......................... G01V 3/06; G01V 3/15
[52] U.S. Cl. ..................................... 324/365; 324/357
[58] Field of Search ............... 324/347, 357, 360, 362, 324/365, 64

[56] References Cited

U.S. PATENT DOCUMENTS

| | | | |
|---|---|---|---|
| 2,531,088 | 11/1950 | Thompson | 324/365 |
| 3,052,836 | 9/1962 | Postma | 324/365 |
| 3,344,342 | 9/1967 | Kinghorn | 324/360 |
| 4,041,372 | 8/1977 | Miller et al. | 324/357 |

Primary Examiner—Gerard R. Strecker
Attorney, Agent, or Firm—Pravel, Gambrell, Hewitt, Kirk, Kimball & Dodge

[57] ABSTRACT

The apparent electrical resistivities of various parts of a marine bottom are determined by supplying an alternating electrical current to a pair of current supply electrodes and measuring potential differences between pairs of measuring locations. The locations are on a straight line on the marine bottom. There is a fixed ratio between the distance between the locations of each pair and the distance between said pair and the pair of current supply locations. Adjoining pairs of measuring locations have a measuring location in common.

A flexible cable for taking these measurements is described.

The determined resistivities are subsequently compared with calculated resistivities to determine the compositions and thicknesses of the soil layers of the marine bottom.

14 Claims, 6 Drawing Figures

PLURAL ELECTRODE METHOD AND MEANS FOR WATER BOTTOM LOGGING

The invention relates to a method and means for water bottom logging to obtain information on soil layers in the bottom of a body of water by determining the apparent electrical resistivity of various parts of the bottom and the superimposed body of water.

The invention relates in particular to a method for water bottom logging to obtain information on soil layers in the bottom of a body of water, by supplying an alternating electrical current to the water bottom at a pair of current supply locations and measuring the potential differences between pairs of measuring locations at the water bottom for determining the apparent electrical resistivity of various parts of the water bottom and the superimposed body of water, wherein the locations are spaced along a substantially straight line, the pairs of measuring locations are situated at one side of the pair of current supply locations and a fixed ratio exists between the distance between each two measuring locations forming a pair and the distance between such pair and the pair of current supply locations.

The invention also relates to a flexible measuring cable carrying electrodes that are subdivided in a first group of current supply electrodes and a second group of measuring electrodes, said groups being arranged along the length of the cable in non-overlapping positions.

This technique of water bottom logging has been described by J. Bischoff and J. Sebulke in their paper 406 "Geo-electrical resistivity methods for use in marine prospection" presented on the Inter Ocean Symposium held in Düsseldorf (W. Germany) in 1976, and in Mitteilungen Geol.-Paläont. Inst. Univ. Hamburg—Sonderband Alster—pages 123-137, Hamburg, November, 1976, and by J. Sebulke in his dissertation "Entwickelung und Untersuchung einer Widerstandsmethodik zur geoelektrischen Prospektion im marinen Bereich" (Berlin 1973). A simplified model of the body of water and the water bottom is assumed in this technique, the bottom consisting of two layers that are homogeneous and isotropic relative to their resistivity and having parallel boundaries. For a particular electrode configuration, the apparent resistivities of the water bottom are then calculated for various water depths and various thicknesses and compositions of the layers. After the apparent resistivities of various parts of a water bottom and superimposed body of water have been determined by towing a flexible cable along the bottom supplying alternating electrical current to the current supply electrodes thereof and measuring potential differences at the measuring electrodes thereof, the determined apparent resistivities are interpreted by comparing them with the data on the apparent resistivities as calculated for the hypothetical water bottoms.

It has now been found that optimum results may be obtained by arranging the pairs of measuring locations to adjoin each other such that each two adjoining pairs have a measuring location in common.

The potential differences can then be measured in a cheap, simple and quick manner. A measuring cable having a minimum amount of measuring electrodes and electric leads can be used for this purpose.

The means according to the invention for water bottom logging comprises a flexible cable with insulated electrical leads, and carrying electrodes on the outer wall thereof that are electrically connected to at least some of the leads, said electrodes being arranged along the cable in a configuration consisting of at least two non-overlapping groups of electrodes, a first group of these electrodes being current supply electrodes, and the electrodes of the other group or groups being measuring electrodes for measuring potential differences between at least two pairs of electrodes, wherein a fixed ratio exists between the distance between the electrodes of each pair of measuring electrodes and the distance between said pair of measuring electrodes and the first group of electrodes, and wherein further the pairs of measuring electrodes adjoin each other such that each two pairs have one measuring electrode in common.

The invention will be described by way of example in more detail with reference to the drawing, wherein.

Figure 1:
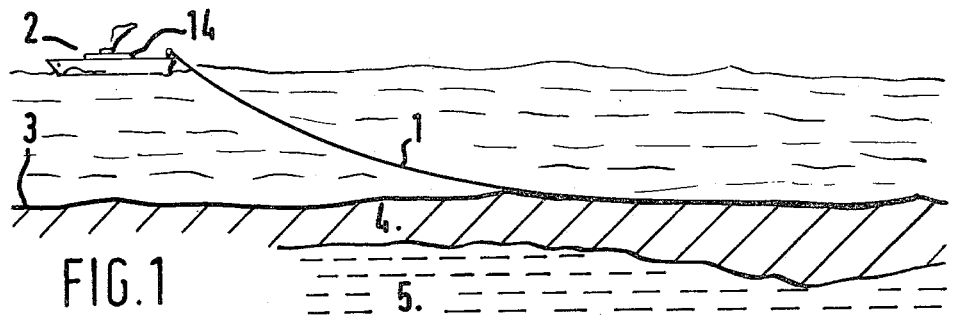
FIG. 1 shows a side view of a vessel towing a measuring cable for carrying out the present technique.
Figure 2:
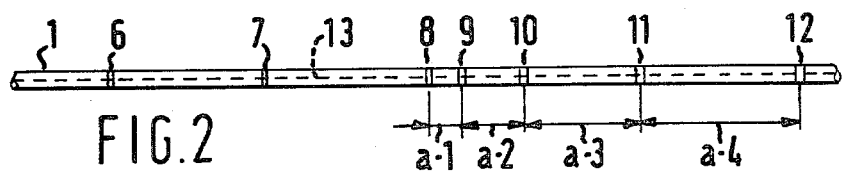
FIG. 2 shows a detail of the cable part carrying the electrodes.
Figure 3:
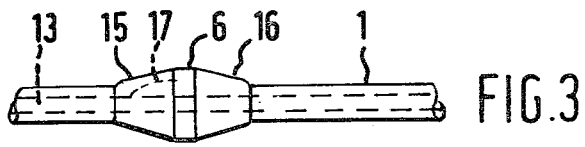
FIG. 3 shows a side view of a single electrode arranged on the cable.
Figure 4:
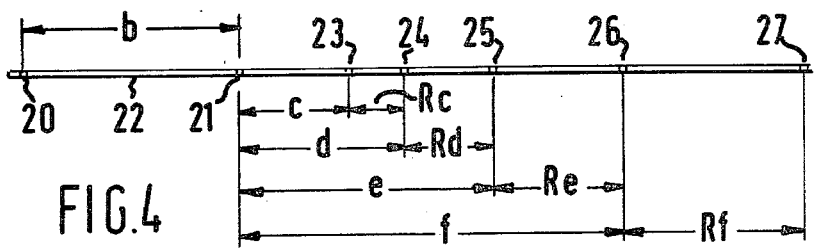
FIG. 4 shows a particular configuration of the electrodes on the cable.
Figure 5:
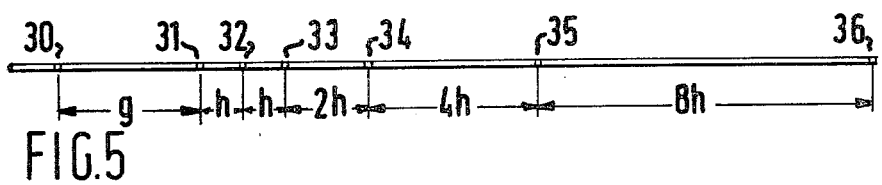
FIG. 5 shows an alternative of the configuration shown in FIG. 4.

The logging cable 1 (see FIG. 1) is of a flexible nature and carries electrodes in a configuration as shown in any one of the FIGS. 2, 4 and 5. As shown in the drawing, the cable 1 is being towed by the vessel 2 along the water bottom 3 consisting of a sand layer 4 on top of a clay layer 5. The cable 1 carries a plurality of electrodes 6–12 as shown in FIG. 2, which electrodes are electrically connected by a plurality of electric leads 13 arranged in the cable 1 and suitable for transmitting electric currents and signals to electrical equipment 14 aboard the vessel 1. FIG. 3 shows a side view of the electrode 6. This electrode (as well as the other electrodes) consists of a metal (such as steel) ring through which the cable 1 passes. The electrode is mounted (such as by glueing) on the outer surface of the cable 1 and shoulders 15 and 16 are glued at both sides of the ring and the outer surface of the cable 1, to keep the electrode 6 in place. The electrode is connected by an electrical lead 17 to one or more of the electrical leads 13 that are arranged within the cable 1 in an insulating manner.

The electrical equipment 14 (see FIG. 1) aboard the vessel 2 comprises an oscillator for generating a low frequence electric signal that after amplification is supplied via two of the leads 13 to the current supply electrodes 6 and 7 of the cable 1. Also, the equipment 14 is electrically connected to those of the leads 13 that lead to the electrodes 8–12. The potential differences between pairs of these electrodes are amplified, filtered and recorded on a tape and a printer (forming part of the equipment 14), and together with the recordings of the alternating current supplied to the electrodes 6 and 7. Calculating means are also incorporated in the equipment 14 for calculating the apparent electrical resistivities of the areas that are covered by the relevant pairs of measuring electrodes on being towed along the water bottom. These resistivities are recorded as a function of the areas.

The distances a-1, a-2, a-3 and a-4 (see FIG. 2) between the measuring electrode pairs 8 and 9, 9 and 10, 10 and 11, and 11 and 12, respectively, are chosen such that there exists a fixed ratio between the distance between each pair of measuring electrodes and the distance between each such pair of electrodes and the pair of current supply electrodes 6 and 7. Further, each two pairs of measuring electrodes adjoining one another have a measuring electrode in common. This configuration of the measuring electrodes allows the use of a limited number of measuring electrodes and electric leads 13, and a quick and easy way of measuring the potential differences between the electrodes since the potential measured at each of the electrodes 9, 10 and 11 can be used for determining the potential difference between each pair of electrodes that have one of these electrodes in common.

One such configuration of the electrodes on the cable is shown in FIG. 4 of the drawing. The group of current supply electrodes in this configuration consists of two electrodes 20, 21 that are located at a distance b from each other on the cable 22. The group of measuring electrodes consists of the electrodes 23, 24, 25, 26 and 27 and is located at a distance c from the group of current supply electrodes. Further, the distances between the pairs of measuring electrodes 23, 24; 24, 25; 25, 26; and 26, 27 are R×c, R×d, R×e and R×f, respectively, wherein R is a factor that is larger than 1, equal to 1, or smaller than 1 (but not zero). As is clear from FIG. 4, the distances d, e and f are related to one another and to the distance c as follows:

d = c (1+R)
e = d (1+R)
f = e (1+R)

Thus, each pair of measuring electrodes (such as the pair 25, 26) has a distance (R×e) between the electrodes (25, 26) that is R-times the distance (e) between said pair of electrodes (25, 26) and the pair of current supply electrodes 20, 21. The application of such a fixed ratio R in the electrode configuration comprising a plurality of adjoining pairs of measuring electrodes decreases the number of measuring electrodes that is required for obtaining the desired measuring data that are to be compared with the calculated graphs that are representative for the apparent electrical resistivities of hypothetical water bottoms comprising layers of different composition and of a wide scale of thicknesses. For various water depths and bottom layers of various compositions and thicknesses, such graphs have been calculated for pairs of measuring locations situated at various distances from the current supply locations, the distance between the locations of each pair of measuring locations being R-times the distance between the pair of current supply locations and the said pair of measuring locations. The data on the apparent electrical resistivities determined by the measuring results obtained from the various locations on the sea bottom by means of the pairs of measuring electrodes arranged in the manner of the invention, and the data on the alternating electrical current supplied to the bottom are subsequently compared with the calculated graphs to determine the composition and thickness of the bottom layers at those locations.

FIG. 5 of the drawings shows a configuration of electrodes of the type described hereinabove with reference to FIG. 4, but now having a ratio R equal to 1. The distance between the two electrodes 30, 31 belonging to the group of current supply electrodes is g, whereas the distance between the group of current supply electrodes and the group of measuring electrodes 32-36 is h. Further, the distances between the pairs of measuring electrodes 32, 33; 33, 34; 34, 35; and 35, 36 are equal to h, 2h, 4h and 8h, respectively. Thus, the distance between the electrodes of any pair of measuring electrodes is equal to the distance between said pair of measuring electrodes and the group of current supply electrodes.

Figure 6:
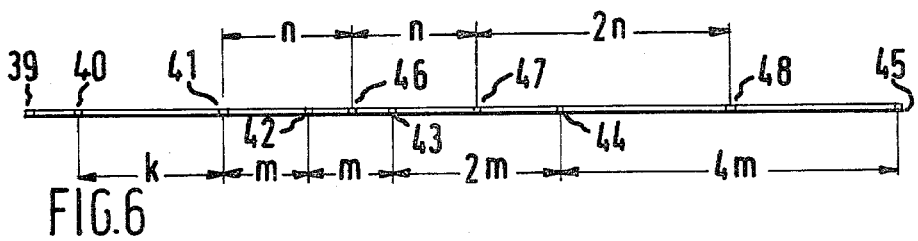
FIG. 6 shows a special configuration of the type shown in FIG. 4.

FIG. 6 finally shows an embodiment of the invention comprising three groups of electrodes having a configuration pattern equal to the configuration pattern shown in FIG. 5.

The first group of electrodes carried by the cable 39, shown in FIG. 6 consists of two current supply electrodes 40, 41 that are located on the cable 39 at a distance k from one another.

The second group of electrodes consists of the measuring electrodes 42–45. The electrodes of the pairs 42, 43; 43, 44; and 44, 45 of this group are situated at distances m 2m and 4m, respectively. The distance between this second group and the first group is m, which is equal to the distance between the electrodes 42, 43 of this second group.

The third group of electrodes consists of the measuring electrodes 46, 47 and 48, and the distance between the electrodes of the pairs of electrodes 46, 47; and 47, 48 is n and 2n, respectively. The distance between this third group and the first group is n, which is equal to the distance between the electrodes 46, 47 of this third group.

In carrying out measurements with the cable shown in FIG. 6, an alternating electrical current is supplied to the current supply electrodes of the first group (in the manner as described hereinbefore with reference to the embodiment shown in FIG. 2 of the drawing). Simultaneously therewith, the cable 39 is being towed according to a predetermined desired passage along the water bottom, and the potential differences detected by the pairs of electrodes 42, 43; 43, 44; 44, 45; 46, 47; and 47, 48 and resulting from the alternating current supplied to the water bottom, are passed on through the (not shown) electrical leads of the cable 39 to the towing vessel. These potential differences may be measured either simultaneously or consecutively. The measured potentials are recorded together with the data on the alternating current and the apparent electrical resistivity of the water bottom parts below each pair of measuring electrodes is subsequently calculated. Comparison of the calculated values with graphs of hypothetical water bottoms at various water depths and comprising layers of different composition and various thicknesses allows the operator to map the layers of the water bottom that is being surveyed. The apparent electrical resistivities of the hypothetical water bottom and the superimposed body of water have been calculated beforehand on the base of an arrangement of various pairs of measuring locations having the locations of each pair located at a distance from one another that is equal to the distance between this pair of measuring locations and the pair of current supply locations. Since each pair of measuring electrodes of the cable shown in FIG. 6 has an electrode in common and is arranged in the same manner as pairs of measuring locations applied in calculating the graphs representative of the hypothetical water bottom, it will be appreciated that the configuration of the electrodes shown in FIG. 6 allows the use of a restricted number of electrodes on a restricted length of cable, however, without restricting the operator in determining with great accuracy the composition and thickness of the relatively deeplying layers of the water bottom.

Each group of measuring electrodes should consist of at least two pairs of electrodes. Since the two pairs of electrodes have one electrode in common, each group of measuring electrodes then consists of at least three measuring electrodes. Application of the invention is, however, not limited to this particular number of three measuring electrodes that are carried by a common cable. More than three measuring electrodes may be used as well. Also, the invention is not limited to a particular number of groups of measuring electrodes that are being applied on a common cable.

Although the current supply electrodes shown in the embodiments of the invention are all in a leading position with respect to the groups of measuring electrodes when the cable is being towed along the water bottom, the invention is by no means restricted to such a configuration of the electrodes with respect to the towing direction, since the same measuring results will be obtained when the cables shown in the drawing are being towed along the water in a substantially straight line in opposite direction.

Although application of the electrode shown in FIG. 3 is preferred for carrying out the present method, electrodes of other constructions may be applied as well. On being towed along the water bottom, the electrodes should preferably contact the bottom or be within the mud layer generally present on such water bottom.

It will be appreciated that the desired measurements may also be taken during a period that the logging cable is kept stationary on the water bottom. After the measurements have been taken, the cable may be displaced to another area of the water bottom and kept stationary for taking a further measurement. This procedure may be repeated a desired number of times.

We claim:

1. A method for water bottom logging to obtain information on soil layers in the bottom of a body of water, by supplying an alternating electrical current to the water bottom at a pair of current supply locations and measuring the potential differences between pairs of measuring locations at the water bottom for determining the apparent electrical resistivity of various parts of the water bottom and the superimposed body of water, wherein the locations are spaced along a substantially straight line, the pairs of measuring locations are situated at one side of the pair of current supply locations and a fixed ratio exists between the distance between each two measuring locations forming a pair and the distance between such pair and the pair of current supply locations, and wherein further the pairs of measuring locations adjoin each other such that each two adjoining pairs have a measuring location in common.

2. The method according to claim 1, wherein the ratio is equal to 1.

3. The method according to claim 1 or 2, comprising at least two overlapping groups of adjoining pairs of measuring locations.

4. The method according to claims 1 or 2, wherein the potential differences at the pairs of measuring locations are measured consecutively.

5. The method according to claims 1 or 2, wherein the apparent electrical resistivities determined for various parts of the water bottom and the superimposed body of water are compared with graphs of calculated apparent electrical resistivities of hypothetical water bottoms comprising layers of different compositions and thicknesses to determine the composition and thickness of each of the layers at the said various parts.

6. Means for water bottom logging comprising a flexible cable with insulated electrical leads, and carrying electrodes on the outer wall thereof that are electrically connected to at least some of the leads, said electrodes being arranged along the cable in a configuration consisting of at least two non-overlapping groups of electrodes, a first group of these electrodes being current supply electrodes, and the electrodes of the other group or groups being measuring electrodes for measuring potential differences between at least two pairs of electrodes, wherein a fixed ratio exists between the distance between the electrodes of each pair of measuring electrodes and the distance between said pair of measuring electrodes and the first group of electrodes, and wherein further the pairs of measuring electrodes adjoin each other such that each two pairs have one measuring electrode in common.

7. Logging cable according to claim 6, wherein said ratio is equal to 1.

8. Logging cable according to claim 6 or 7, carrying at least two groups of measuring electrodes that overlap one another along the cable.

9. Logging cable according to claims 6 or 7, wherein the electrodes comprise metal rings through which the cable passes.

10. The method according to claims 1 or 2, wherein the potential differences at the pairs of measuring locations are measured consecutively and further comprising at least two overlapping groups of adjoining pairs of measuring locations.

11. The method according to claims 1 or 2, wherein the apparent electrical resistivities determined for various parts of the water bottom and the superimposed body of water are compared with graphs of calculated apparent electrical resistivities of hypothetical water bottoms comprising layers of different compositions and thicknesses to determine the composition and thickness of each of the layers at the said various parts and further comprising at least two overlapping groups of adjoining pairs of measuring locations.

12. The method according to claims 1 or 2, wherein:
   (a) the apparent electrical resistivities determined for various parts of the water bottom and the superimposed body of water are compared with graphs of calculated apparent electrical resistivities of hypothetical water bottoms comprising layers of different compositions and thicknesses to determine the composition and thickness of each of the layers at the said various parts;
   (b) the potential differences at the pairs of measuring locations are measured consecutively; and,
   (c) at least two overlapping groups of adjoining pairs of measuring locations.

13. The method according to claims 1 or 2, wherein:
   (a) the apparent electrical resistivities determined for various parts of the water bottom and the superimposed body of water are compared with graphs of calculated apparent electrical resistivities of hypothetical water bottoms comprising layers of different compositions and thicknesses to determine the composition and thickness of each of the layers at the said various parts; and,
   (b) the potential differences at the pairs of measuring locations are measured consecutively.

14. Logging cable according to claims 6 or 7, wherein the electrodes comprise metal rings through which the cable passes and further comprising at least two groups of measuring electrodes that overlap one another along the cable.

* * * * *